United States Patent
Chen et al.

(10) Patent No.: US 12,182,054 B2
(45) Date of Patent: Dec. 31, 2024

(54) COMMUNICATION SYSTEM BASED ON PARALLEL BUS

(71) Applicant: ZONGMU TECHNOLOGY (SHANGHAI) CO., LTD., Shanghai (CN)

(72) Inventors: Dong Chen, Shanghai (CN); Xiaofeng Liu, Shanghai (CN); Hongfeng Zhu, Shanghai (CN)

(73) Assignee: ZONGMU TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/549,357

(22) PCT Filed: Dec. 15, 2021

(86) PCT No.: PCT/CN2021/138224
§ 371 (c)(1),
(2) Date: Sep. 7, 2023

(87) PCT Pub. No.: WO2022/206028
PCT Pub. Date: Oct. 6, 2022

(65) Prior Publication Data
US 2024/0045825 A1 Feb. 8, 2024

(30) Foreign Application Priority Data
Mar. 30, 2021 (CN) .......................... 202110342079.6

(51) Int. Cl.
*G06F 13/00* (2006.01)
*G06F 13/40* (2006.01)
*G06F 13/42* (2006.01)

(52) U.S. Cl.
CPC ........ *G06F 13/4204* (2013.01); *G06F 13/404* (2013.01)

(58) Field of Classification Search
None
See application file for complete search history.

(56) References Cited

U.S. PATENT DOCUMENTS 10,009,029 B1 * 6/2018 Chen .................... G06F 13/385
2003/0034883 A1 * 2/2003 Sato .................... G01S 7/52004
701/45

(Continued)

FOREIGN PATENT DOCUMENTS

| CN | 101324875 A | 12/2008 |
| CN | 101355482 A | 1/2009 |

(Continued)

OTHER PUBLICATIONS

International Search Report of International Application No. PCT/CN2021/138224.

(Continued)

*Primary Examiner* — Henry Tsai
*Assistant Examiner* — Dean Phan
(74) *Attorney, Agent, or Firm* — KILPATRICK TOWNSEND & STOCKTON LLP

(57) ABSTRACT

The present disclosure provides a parallel bus-based communication system, the system including: electronic devices; a host controller equipped with a selecting chip and a communication chip, and the communication chip controls at least one channelized parallel bus, and the electronic devices are individually connected to the channelized parallel bus. The host controller, upon first power on, allocates addresses to the electronic device sequentially via the selecting chip. In the present disclosure, the communication chip of the communication system employs a parallel bus communication mode, and the selecting chip sequentially allocates addresses to the electronic device. Communication functions can be achieved by using a small number of communication chips. The electronic devices (sensors) are (Continued)

independent of each other and do not affect one another. The existing sensor structures and vehicle harness may be used, which has cost advantages.

6 Claims, 2 Drawing Sheets

(56) References Cited

U.S. PATENT DOCUMENTS

| | | | |
|---|---|---|---|
| 2016/0292107 A1 | 10/2016 | Kim | |
| 2020/0125520 A1* | 4/2020 | Perchlik | G06F 13/4022 |
| 2022/0289141 A1* | 9/2022 | Shah | B60R 16/023 |

FOREIGN PATENT DOCUMENTS

| | | | |
|---|---|---|---|
| CN | 101755259 | A | 6/2010 |
| CN | 102012885 | A | 4/2011 |
| CN | 102411550 | A | 4/2012 |
| CN | 103123615 | A | 5/2013 |
| CN | 103578232 | A | 2/2014 |
| CN | 105550147 | A | 5/2016 |
| CN | 105550154 | A | 5/2016 |
| CN | 107682467 | A | 2/2018 |
| CN | 207652486 | U | 7/2018 |
| CN | 110391823 | A | 10/2019 |
| CN | 209543335 | U | 10/2019 |
| CN | 113032318 | A | 6/2021 |

OTHER PUBLICATIONS

Office Action of Chinese Patent Application No. 202110342079.6 Mailed Mar. 1, 2022.
Office Action of Chinese Patent Application No. 202110342079.6 Mailed May 17, 2022.
Decision on Grant of Chinese Patent Application No. 202110342079.6 Mailed Aug. 5, 2022.

* cited by examiner

COMMUNICATION SYSTEM BASED ON PARALLEL BUS

FIELD

The present disclosure relates to the field of communication, in particular to a parallel bus-based communication system.

BACKGROUND

An ultrasonic sensor is a sensor that converts an ultrasonic signal into another energetic signal (usually an electrical signal). An ultrasonic wave is a mechanical wave with a vibration frequency higher than 20 kHz. It has the characteristics of a high frequency, a short wavelength, small diffraction, and especially a good directionality, which enables directional propagation of the ultrasonic wave as a ray. The ultrasonic wave penetrates liquids and solids very well, especially in solids that are opaque to sunlight. When an ultrasonic wave encounters with an impurity or interface, a significant reflection occurs and a reflected echo will be formed. When an ultrasonic wave encounters with a moving object, a Doppler effect occurs. Ultrasonic sensors are widely used in industries, national defense, biomedicine, and other aspects.

To meet the requirements for functional safety and the need for transmission of a large amount of sensor raw data, the communication between a next generation ultrasonic sensor and a host employs a bus communication mode. In this mode, the host may have a corresponding communication chip supporting a parallel bus, and the sensors communicate data with the host via the communication chip.

Currently, manufacturers substantially employ two modes for bus-based communication:
1. A serial communication mode. This mode requires that the sensor has four pins, two of which are used for communication, and the other two pins are used for power and ground, respectively. However, most commercially available ultrasonic sensors have 3 pins. If 4 pins are adopted, the conventional sensor structures and vehicle harness may not be used. Further, with the serial communication mode, if one of the sensors is abnormal, all other sensors on the same link will be affected.
2. A point to point communication mode. This communication mode can meet the requirements in the amount of data transmitted as well as in sensor pins. However, it requires a large number of communication chips, resulting in a relatively complex communication structure, and a high communication cost.

SUMMARY

In view of the shortcomings of the prior art mentioned above, an embodiment of the present disclosure is to provide a parallel bus-based communication system, for solving the problems of mutual influences between sensors or high communication cost when the sensors are communicating with the host in the prior art.

To achieve the above and other related embodiments of the present disclosure provide a parallel bus-based communication system, including: electronic devices; a host controller configured with a selecting chip and a communication chip, and the communication chip controls at least one channelized parallel bus, the electronic devices are individually connected to the channelized parallel bus; the host controller, upon first power on, allocates addresses to the electronic devices sequentially via the selecting chip.

In an embodiment of the present disclosure, each of the electronic devices has a power pin, a ground pin, and a communication pin.

In an embodiment of the present disclosure, electronic devices form at least one set of electronic devices; the communication pins of the electronic devices in each set of electronic devices are connected to a corresponding channelized parallel bus.

In an embodiment of the present disclosure, the selecting chip controls at least one power line, each power line is connected to the power pins of a set of electronic devices.

In an embodiment of the present disclosure, the selecting chip controls a power line to which the power pins of all electronic devices are connected.

In an embodiment of the present disclosure, the host controller controls at least one ground line, each ground line is connected to the ground pins of at least one set of electronic devices.

In an embodiment of the present disclosure, the host controller controls a ground line to which the ground pins of all electronic devices are connected.

In an embodiment of the present disclosure, where the selecting chip controls the power pin of one electronic device to be powered on and the power pins of the remaining electronic devices to be powered off, the host controller allocates an address to the electronic device whose power pin is powered on.

In an embodiment of the present disclosure, each electronic device of the electronic devices stores an allocated address and includes the address of the electronic device in communication data when communicating with the host controller.

In an embodiment of the present disclosure, the electronic devices include ultrasonic sensors.

As described above, the parallel bus-based communication system of the present disclosure has the following beneficial effects:

In the present disclosure, the communication chip of the communication system employs a parallel bus for communication, and the selecting chip sequentially allocates addresses to the electronic devices. Communication functions can be achieved by using a small number of communication chips. Electronic devices (sensors) are independent of each other and do not affect one another. The existing sensor structures and vehicle harness may be used, which has cost advantages.

DESCRIPTION OF REFERENCE NUMBERS

Figure 1:
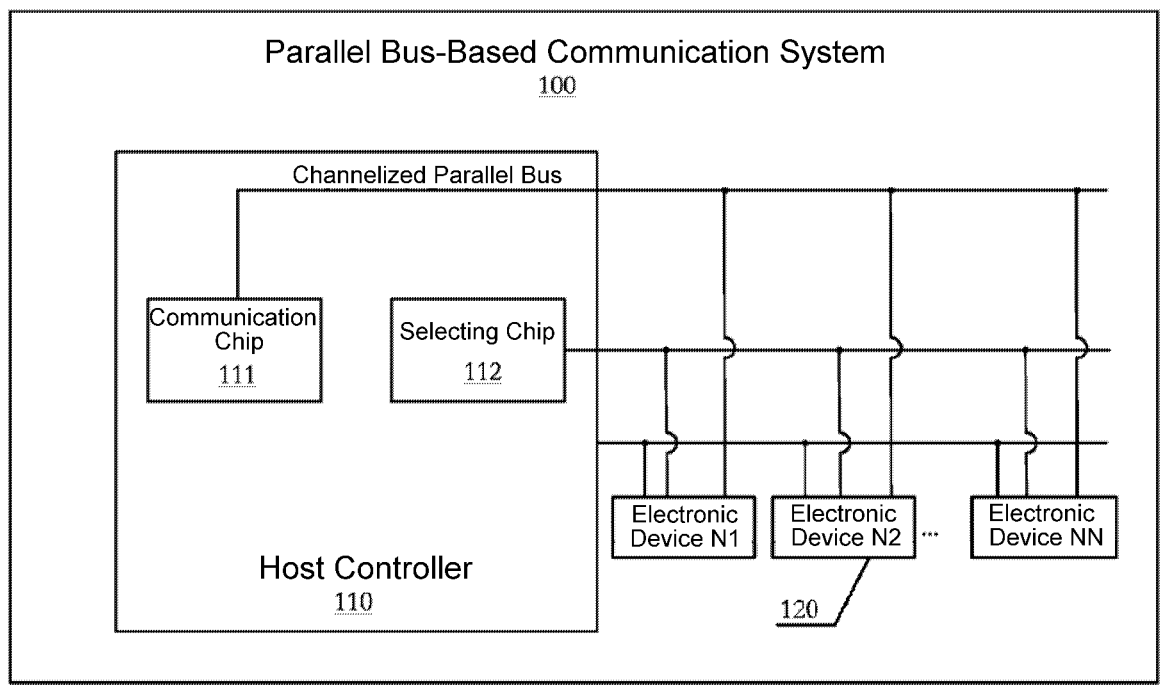
FIG. 1 shows a schematic diagram illustrating principle and structure of a parallel bus-based communication system of the present disclosure.

100 parallel bus-based communication system
110 host controller
111 communication chip
111*a* first channelized parallel bus 11b second channelized parallel bus
112 selecting chip
120 electronic device

DETAILED DESCRIPTION

The following illustrates embodiments of the present disclosure through examples. The present disclosure can also be implemented or applied through other different specific embodiments. The various details in this description can also be modified or changed based on different perspectives and applications without departing from the spirit of the present disclosure. It should be noted that, the following embodiments and features in the embodiments can be combined with each other in the case of no conflict.

The embodiments are to provide a parallel bus-based communication system, for solving the problems of mutual influences between sensors or high communication cost when the sensors are communicating with the host in the prior art.

The following will set forth in detail the principle and embodiments of the parallel bus-based communication system of the embodiments, and the parallel bus-based communication system of the present disclosure.

As shown in FIG. 1, an embodiment of this disclosure provides a parallel bus-based communication system 100, which includes a host controller 110 and electronic devices 120. The host controller 110 is configured with a selecting chip 112 and a communication chip 111.

In the embodiments, the parallel bus-based communication system 100 may be applied in, but not limited to, a parking radar system. The host controller 110 may be, but not limited to, a parking host controller. The electronic devices 120 may be, but not limited to, sensors. In one embodiment, the electronic devices 120 are ultrasonic sensors.

It should be noted that the host controller 110 and the electronic devices 120 are not limited to those listed in the embodiments. Any variations and substitutes to known host controller 110 and electronic devices 120 made according to the principles of the parallel bus-based communication system 100 in the embodiments fall within the scope of the parallel bus-based communication system 100 in the embodiments.

In an embodiment of the disclosure, the communication chip 111 controls at least one channelized parallel bus, where the electronic devices 120 are individually connected to the channelized parallel bus. The host controller 110, upon first power on, allocates addresses to the electronic devices 120 sequentially via the selecting chip 112.

In the embodiments, the communication chip 111 may control one channelized parallel bus, two channelized parallel buses, . . . , N channelized parallel buses. The embodiments do not limit the number of channelized parallel buses controlled by the communication chip 111. With the embodiments, they may configure or select the number of channelized parallel buses for the communication chip 111 according to actual requirements.

Figure 2:
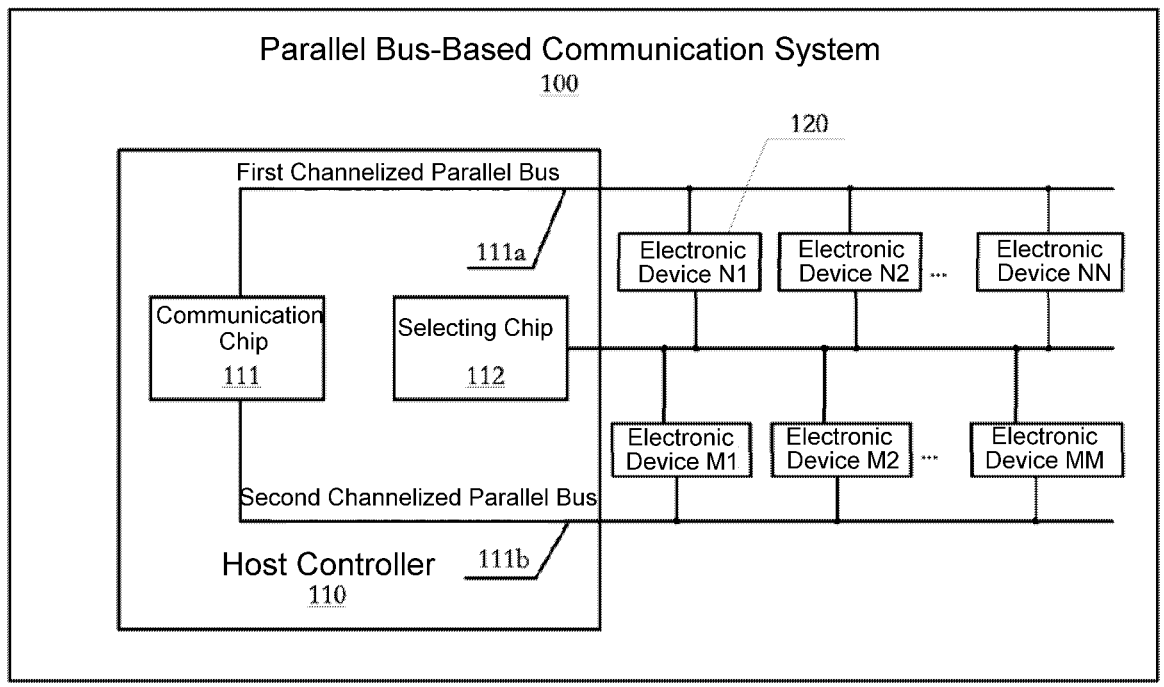
FIG. 2 shows an example structural diagram of a parallel bus-based communication system of the present disclosure with a communication chip controlling two channelized parallel buses.

In an embodiment of the disclosure, illustration is made with the communication chip 111 controlling two channelized parallel buses as an example. The embodiments of the communication chip 111 controlling more than two channelized parallel buses will not be further described here. FIG. 2 shows an example structural diagram of a parallel bus-based communication system of the present disclosure with the communication chip 111 controlling two channelized parallel buses. For example, as shown in FIG. 2, the communication chip 111 has a first channel and a second channel. The outgoing wires of the first channel form a first channelized parallel bus 111a, and the outgoing wires of the second channel form a second channelized parallel bus 111b. As the communication chip 111 controls two buses, electronic devices 120 are connected to the two buses.

In one embodiment, as shown in FIG. 2, the communication chip 111 controls the first channelized parallel bus 111a and the second channelized parallel bus 111b. The electronic devices 120 are individually connected to the first channelized parallel bus 111a or the second channelized parallel bus 111b. For example, in FIG. 2, electronic devices 120 include a total of 2N electronic devices, in which electronic device N1, electronic device N2, . . . , electronic device NN (a total of N electronic devices 120) are individually connected to the first channelized parallel bus 111a, electronic device M1, electronic device M2, . . . , electronic device MN (a total of N electronic devices 120) are individually connected to the second channelized parallel bus 111b.

In an embodiment of this disclosure, the communication chip 111 of the communication system employs a bus communication mode of parallel buses including of the first channelized parallel bus 111a and the second channelized parallel bus 111b. The electronic devices 120 are individually connected to the communication chip 111, and perform data interaction with the host controller 110 via the communication chip 111. The electronic devices 120 are independent of each other and do not affect one another.

In one embodiment, as the electronic devices 120 in the embodiments are individually connected to the communication chip 111 and independent of each other, the electronic devices 120 each has three pins, enabling the electronic devices 120 of the embodiments to employ existing sensor structures and vehicle harness in applications, enhancing the applicability of the communication structure and effectively reducing the cost of the communication structure.

In an embodiment of this disclosure, each of the electronic devices 120 has, but not limited to, a power pin, a ground pin, and a communication pin.

In one embodiment, the power pin is connected to the selecting chip 112, which controls power-on or power-off of the power pin. The ground pin is connected to the host controller 110. The communication pin is connected to the first channelized parallel bus 111a or the second channelized parallel bus 111b of the communication chip 111.

In one embodiment, if the number of electronic devices 120 and the amount of data transmitted are not very large, one communication chip 111 can achieve the communication between the electronic devices 120 and the host controller 110. The number of communication chips 111 can be adjusted accordingly based on the number of electronic devices 120 and the amount of data transmitted.

Accordingly, if the number of electronic devices 120 is not very large, one selecting chip 112 can achieve the selection of the electronic devices. The number of selecting chips 112 can be adjusted accordingly based on the number of electronic devices 120.

In an embodiment of this disclosure, electronic devices 120 form at least one set of electronic devices. Each channelized parallel bus is connected to the communication pins of electronic devices 120 in one set of electronic devices.

For example, as shown in FIG. 2, electronic devices 120 include a first set of electronic devices and a second set of electronic devices. That is, electronic devices 120 are divided into two sets of electronic devices, one set of electronic devices being connected to the first channelized parallel bus 111a, and another set of electronic devices being connected to the second channelized parallel bus 111b.

In one embodiment, the first channelized parallel bus 111a of the communication chip 111 is connected to the communication pins of electronic devices 120 in the first set of electronic devices, and the second channelized parallel bus 111b of the communication chip 111 is connected to the communication pins of electronic devices 120 in the second set of electronic devices.

The communication pins of the electronic devices 120 are individually connected to the parallel bus. That is, the communication pins of the electronic devices 120 are individually connected to the communication chip 111, and the electronic devices 120 (sensors) are independent of each other and do not affect one another.

In an embodiment of this disclosure, an object of the selecting chip 112 is to control an on or off of the power line, to control whether to power electronic device 120. In one embodiment, the selecting chip 112 is used to control the selection of the electronic devices 120. An electronic device 120 selected by the selecting chip 112 is powered on, and the electronic device 120 can be controlled by the host controller 110. An electronic device 120 not selected by the selecting chip 112 is powered off, and the electronic device 120 may not be controlled by the host controller 110.

In one embodiment, the selecting chip 112 is connected to the power pins of the electronic devices 120, respectively, and controls the power pin of each electronic device 120 independently. The selecting chip 112 determines which electronic device 120 to be powered on.

In an embodiment of this disclosure, the selecting chip 112 controls at least one power line, and each power line is connected to the power pins of at least one set of electronic devices.

For example, as shown in FIG. 2, the selecting chip 112 controls two power lines: a first power line and a second power line.

The first power line is connected to the power pins of electronic devices 120 in the first set of electronic devices, for controlling the powering to the power pins of electronic devices 120 in the first set of electronic devices. The second power line is connected to the power pins of electronic devices 120 in the second set of electronic devices, for controlling the powering to the power pins of electronic devices 120 in the second set of electronic devices.

In addition, the selecting chip 112 may control only one power line, to which the power pins of all electronic devices 120 are connected.

In an embodiment of this disclosure, the selecting chip 112 selects only one electronic device 120 at a time to power the power pin of one of the electronic devices 120, and the power pin of one electronic device 120 is connected to a power supply, and the power pins of the remaining electronic devices 120 are powered off. When the selecting chip 112 controls the power pin of one of the electronic devices 120 to be powered on and the power pins of the remaining electronic devices 120 to be powered off, the host controller 110 allocates an address to the electronic device 120 whose power pin is powered on.

In an embodiment of this disclosure, the host controller 110 is connected to the ground pins of the electronic devices 120 respectively, and the ground pins of the electronic devices 120 are connected to ground.

In an embodiment of this disclosure, the host controller controls at least one ground line, and each ground line is connected to the ground pins of at least one set of electronic devices.

For example, as shown in FIG. 2, in an embodiment of this disclosure, the host controller 110 controls a first ground line and a second ground line.

In one embodiment, the first ground line is connected to ground pins of electronic devices 120 in a first set of electronic devices. The second ground line is connected to ground pins of electronic devices 120 in a second set of electronic devices.

In addition, the host controller 110 may control one ground line, to which the ground pins of all electronic devices 120 are connected.

In an embodiment of this disclosure, the host controller 110, upon first power on, allocates addresses to the electronic devices 120 sequentially via the selecting chip 112. Each electronic device 120 stores the allocated address and uploads its respective address to the host controller 110 during a communication process.

In an embodiment of this disclosure, the host controller 110, upon first power on, allocates addresses to the electronic devices 120 sequentially via the selecting chip 112, and the electronic devices 120 connected to the channelized parallel bus are sequentially allocated addresses according to an order that the electronic devices 120 are connected to the channelized parallel bus (such as from left to right).

For example, the communication chip 111 controls one channelized parallel bus, and sequentially allocates addresses to the electronic devices 120 connected to the channelized parallel bus. The specific allocation process is as follows:

When the host controller 110 is first powered on, it controls, via the selecting chip 112, a first electronic device 120 on the channelized parallel bus to be powered on and the remaining electronic devices 120 to be powered off. The host controller 110 allocates an address to the first electronic device 120 on the channelized parallel bus. After allocating the address to the first electronic device 120 on the channelized parallel bus, the host controller 110 controls, via the selecting chip 112, the first electronic device 120 on the channelized parallel bus to be powered off, a second electronic device 120 on the channelized parallel bus to be powered on, and the remaining electronic devices 120 also to be powered off. The host controller 110 proceeds to allocate an address to the second electronic device 120 on the channelized parallel bus. The above process is repeated, until the address allocation for all electronic devices 120 on the channelized parallel bus is completed.

As another example, the communication chip 111 controls two channelized parallel buses: a first channelized parallel bus 111a and a second channelized parallel bus 111b. Addresses are sequentially allocated to the electronic devices 120 connected to the first channelized parallel bus 111a, and then addresses are sequentially allocated to the electronic devices 120 connected to the second channelized parallel bus 111b.

That is, addresses are sequentially allocated to the electronic devices 120 connected to the first channelized parallel bus 111a according to an order that the electronic devices 120 are connected to the first channelized parallel bus 111a (such as from left to right), and addresses are sequentially allocated to the electronic devices 120 connected to the second channelized parallel bus 111b according to an order that the electronic devices 120 are connected to the second channelized parallel bus 111b (such as from left to right). The specific allocation process is as follows:

When the host controller 110 is first powered on, it controls, via the selecting chip 112, a first electronic device 120 on the first channelized parallel bus 111a to be powered on and the remaining electronic devices 120 to be powered off. The host controller 110 allocates an address to the first electronic device 120 on the first channelized parallel bus 111a. After allocating the address to the first electronic device 120 on the first channelized parallel bus 111a, the host controller 110 controls, via the selecting chip 112, the first electronic device 120 on the first channelized parallel bus 111a to be powered off, a second electronic device 120 on the first channelized parallel bus 111a to be powered on, and the remaining electronic devices 120 also to be powered off. The host controller 110 proceeds to allocate an address to the second electronic device 120 on the first channelized parallel bus 111a. The above process is repeated, until the address allocation for all electronic devices 120 on the first channelized parallel bus 111a is completed.

Next, the host controller 110 controls, via the selecting chip 112, a first electronic device 120 on the second channelized parallel bus 111b to be powered on and the remaining electronic devices 120 to be powered off. The host controller 110 allocates an address to the first electronic device 120 on the second channelized parallel bus 111b. After allocating the address to the first electronic device 120 on the second channelized parallel bus 111b, it controls, via the selecting chip 112, the first electronic device 120 on the second channelized parallel bus 111b to be powered off, a second electronic device 120 on the second channelized parallel bus 111b to be powered on, and the remaining electronic devices 120 also to be powered off. The host controller 110 proceeds to allocate an address to the second electronic device 120 on the second channelized parallel bus 111b. The above process is repeated, until the address allocation for all electronic devices 120 on the second channelized parallel bus 111b is completed.

In an embodiment of this disclosure, after the host controller 110 allocates address to an electronic device 120, the electronic device 120 stores the allocated address and includes the address of the electronic device 120 in communication data when communicating with the host controller 110.

That is, during a communication process between the electronic devices 120 and the host controller 110, an instruction packet sent by the host controller 110 contains an electronic device 120. When the electronic device 120 responds to the host controller 110, a response packet contains the address of the electronic device 120.

For example, an in-vehicle ultrasonic sensor stores the allocated address in a built-in nonvolatile memory. The host controller 110 sends an instruction to the in-vehicle ultrasonic sensor based on the allocated address, to achieve communication with the in-vehicle ultrasonic sensor. The in-vehicle ultrasonic sensor that receives the instruction uploads its own address when feeding data back to the host controller 110. In one embodiment, the address of the in-vehicle ultrasonic sensor will be packaged into a communication message to enable the host controller 110 to decode based on the address uploaded by the in-vehicle ultrasonic sensor.

In summary, in the present disclosure, the communication chip of the communication system employs a parallel bus communication mode, and the selecting chip sequentially allocates addresses to the electronic devices. Communication functions can be achieved by using a small number of communication chips. The electronic devices (sensors) are independent of each other and do not affect one another. The existing sensor structures and vehicle harness may be used, which has cost advantages. Therefore, the present disclosure effectively overcomes various shortcomings in the prior art and has a high industrial utilization value.

What is claimed is:

1. A parallel bus-based communication system, comprising:
    a plurality of electronic devices, wherein the electronic devices comprise ultrasonic sensors, wherein each of the electronic devices has a communication pin, a power pin, and a ground pin;
    a host controller configured with a selecting chip and a communication chip, wherein:
    the communication chip is configured to control at least one channelized parallel bus, each of the electronic devices having its communication pin individually connected to the channelized parallel bus, and each of the electronic devices being connected to the host controller via one channelized parallel bus;
    the host controller is configured to, upon first power on, allocate addresses to the electronic devices sequentially via the selecting chip;
    wherein for each electronic device, when the selecting chip controls the power pin of the electronic device to be powered on and controls the power pins of remaining electronic devices to be powered off, the host controller allocates an address to the electronic device whose power pin is powered on,
    wherein the selecting chip controls one power line to which power pins of all electronic devices are connected without controlling any switch.

2. The parallel bus-based communication system according to claim 1, wherein the plurality of electronic devices form at least one set of electronic devices, wherein each channelized parallel bus is connected to the communication pin of each electronic device in one set of electronic devices.

3. The parallel bus-based communication system according to claim 2, wherein the selecting chip controls at least one power line, wherein each power line is connected to power pins of at least one set of electronic devices.

4. The parallel bus-based communication system according to claim 2, wherein the host controller controls at least one ground line, wherein each ground line is connected to ground pins of at least one set of electronic devices.

5. The parallel bus-based communication system according to claim 1, wherein the host controller controls one ground line to which ground pins of all electronic devices are connected.

6. The parallel bus-based communication system according to claim 1, wherein each electronic device of the electronic devices stores an allocated address and includes the address of the electronic device in communication data when communicating with the host controller.

* * * * *